(12) United States Patent
Lee et al.

(10) Patent No.: US 7,215,707 B2
(45) Date of Patent: May 8, 2007

(54) OPTIMAL SCANNING METHOD FOR TRANSFORM COEFFICIENTS IN CODING/DECODING OF IMAGE AND VIDEO

(75) Inventors: Shi-hwa Lee, Seoul (KR); Jong-se Choi, Seoul (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 406 days.

(21) Appl. No.: 10/293,330

(22) Filed: Nov. 14, 2002

(65) Prior Publication Data

US 2003/0128753 A1    Jul. 10, 2003

(30) Foreign Application Priority Data

Jan. 7, 2002    (KR) .................... 10-2002-0000709

(51) Int. Cl.
    *H04B 1/66*    (2006.01)
(52) U.S. Cl. .............. 375/240.18; 375/240.2; 375/240.25; 375/240.24; 375/240.23; 375/240.26; 382/250; 382/233; 382/248; 382/235; 382/246; 348/206
(58) Field of Classification Search ........... 375/240.18, 375/240.2, 240.24, 240.25, 240.26, 240.23; 382/248, 250, 246, 233, 235; 348/206
See application file for complete search history.

(56) References Cited

U.S. PATENT DOCUMENTS

| 5,268,755 A | * | 12/1993 | Nishino et al. | .......... | 348/415.1 |
| 5,367,629 A | * | 11/1994 | Chu et al. | .................. | 382/253 |
| 5,500,678 A | | 3/1996 | Puri | | |
| 5,767,909 A | * | 6/1998 | Jung | ..................... | 375/240.18 |
| 6,263,026 B1 | | 7/2001 | Je-Chang et al. | | |

FOREIGN PATENT DOCUMENTS

| JP | 2062178 | 3/1990 |
| JP | 4150284 | 5/1992 |
| JP | 4247770 | 9/1992 |
| JP | 10229340 | 8/1998 |
| KR | P1996-0036787 | * 10/1996 |
| WO | WO97/46021 | 12/1997 |

OTHER PUBLICATIONS

Notice to Submit Response, by the Korean Patent Office on Apr. 26, 2004, Application No. 10-2002-0000709.

* cited by examiner

*Primary Examiner*—Shawn S. An
(74) *Attorney, Agent, or Firm*—Buchanan Ingesoll & Rooney PC

(57) ABSTRACT

An optimal scanning method for coding/decoding an image signal is provided. In a method of coding an image signal through a discrete cosine transform, at least one is selected among a plurality of reference blocks. A scanning order in which to scan blocks to be coded of the reference blocks is generated and the blocks to be coded are scanned in the order of the generated scanning order. The at least one selected reference block is temporally or spatially adjacent to the block to be coded. When the blocks to be coded are scanned, probabilities that non-zero coefficients occur are obtained from the at least one selected reference block, and the scanning order is determined in descending order starting from the highest probability. Here, the scanning order is generated to be a zigzag scanning order if the probabilities are identical. The optimal scanning method increases signal compression efficiency.

10 Claims, 15 Drawing Sheets

FIG. 5 (PRIOR ART)

| | | | | | |
|---|---|---|---|---|---|
| 350 ZIGZAG SCANNING | SYMBOL (run,level,last) | 351 (0,5,0) | 352 (1,-1,0) | 353 (0,3,0) | 354 (5,1,1) | 355 4 SYMBOLS |
| | VLC | 356 011000 | 357 11101 | 358 11110 | 359 00100110 | 360 24bits |
| 361 VERTICAL SCANNING | SYMBOL (run,level,last) | 362 (0,5,0) | 363 (0,-1,0) | 364 (0,3,0) | 365 (0,1,1) | 366 4 SYMBOLS |
| | VLC | 367 011000 | 368 101 | 369 11110 | 370 01110 | 371 19bits |
| 372 HORIZONTAL SCANNING | SYMBOL (run,level,last) | 373 (0,5,0) | 374 (3,-1,0) | 375 (1,3,0) | 376 (13,1,1) | 377 4 SYMBOLS |
| | VLC | 378 011000 | 379 0100011 | 380 00101100 | 381 000101100 | 382 30bits |

REFERENCE FRAME (t−1)  CURRENT FRAME (t)

CODING BLOCK    REFERENCE BLOCK

FIG. 16

|   |     |     |     |   |   |   |   |
|---|-----|-----|-----|---|---|---|---|
| 1 | 1/4 | 1   | 3/4 | 0 | 0 | 0 | 0 |
| 3/4 | 0 | 0   | 0   | 0 | 0 | 0 | 0 |
| 1 | 1/4 | 2/4 | 0   | 0 | 0 | 0 | 0 |
| 2/4 | 1/4 | 0 | 0   | 0 | 0 | 0 | 0 |
| 1/4 | 0 | 0   | 0   | 0 | 0 | 0 | 0 |
| 0 | 0   | 0   | 0   | 0 | 0 | 0 | 0 |
| 0 | 0   | 0   | 0   | 0 | 0 | 0 | 0 |
| 0 | 0   | 0   | 0   | 0 | 0 | 0 | 0 |

| 1  | 8  | 3  | 5  | 15 | 16 | 28 | 29 |
|----|----|----|----|----|----|----|----|
| 4  | 12 | 13 | 14 | 17 | 27 | 30 | 43 |
| 2  | 9  | 7  | 18 | 26 | 31 | 42 | 44 |
| 6  | 11 | 19 | 25 | 32 | 41 | 45 | 54 |
| 10 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

900

FIG. 20
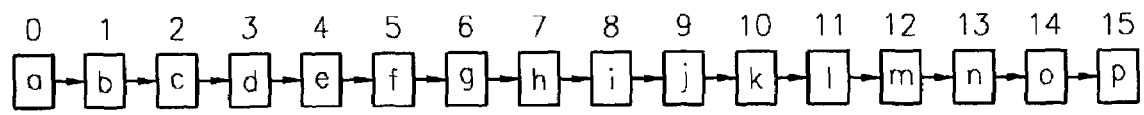
FIG. 21
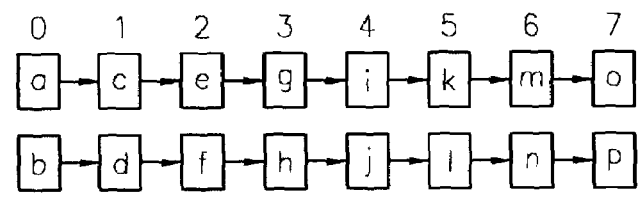
FIG. 22
| 1.0 | 0.8 | 0.4 | 0.1 |
|-----|-----|-----|-----|
| 0.7 | 0.3 | 0.1 | 0.1 |
| 0.2 | 0.1 | 0.0 | 0.0 |
| 0.1 | 0.0 | 0.0 | 0.0 |

FIG. 23

| 0 | 1 | 3 | 6 |
|---|---|---|---|
| 2 | 4 | 7 | 10 |
| 5 | 8 | 12 | 13 |
| 9 | 11 | 14 | 15 |

FIG. 24

| 0 | 0 | 1 | 3 |
|---|---|---|---|
| 1 | 2 | 3 | 5 |
| 2 | 4 | 6 | 6 |
| 4 | 5 | 7 | 7 |

OPTIMAL SCANNING METHOD FOR TRANSFORM COEFFICIENTS IN CODING/DECODING OF IMAGE AND VIDEO

BACKGROUND OF THE INVENTION

This application claims the priority of Korean Patent Application No. 2002-709, filed Jan. 7, 2002, in the Korean Intellectual Property Office, the disclosure of which is incorporated herein in its entirety by reference.

1. Field of the Invention

The present invention relates to a method of coding/decoding an image signal, and more particularly, to an optimal scanning method for transform coefficients in coding/decoding of an image or video.

2. Description of the Related Art

Image signals, e.g., images or videos, are compressed or coded according to the standards of moving picture expert group phase 1 (MPEG-1), MPEG-2, MPEG-4, H.261, H.263, or JPEG through a discrete cosine transform (hereinafter, referred to as "DCT"). Also, compressed or coded image signals are decoded through an inverse discrete cosine transform (hereinafter, referred to as "IDCT"). Selecting an optimal scanning method is a key point when trying to increase coding/decoding efficiency.

A scanning pattern described in U.S. Pat. No. 5,500,678 increases coding efficiency and is selected as a scanning pattern of MPEG-4 intra-coding. The scanning pattern of '678 uses a zigzag scanning pattern and a predefined scanning pattern.

Accordingly, the zigzag scanning pattern and the predefined scanning pattern are not efficient at coding all image signals. Also, since information on a selected scanning pattern should be coded with the image signals and provided to a decoder, the number of bits transmitted to the decoder increases. Further, the scanning pattern of '678 is predefined and thus there is a limit in selecting an optimal scanning pattern for various decoding blocks.

Scanning patterns described in U.S. Pat. No. 6,263,026 have a problem of reducing coding efficiency because a selected data word becomes too long if there are too many scanning patterns. Also, predefined finite scanning patterns used in '026 are not efficient in all image signals or data.

SUMMARY OF THE INVENTION

To solve the above-described problems, it is an object of the present invention to provide an optimal scanning method for various coding/decoding blocks to increase compression efficiency of an image signal.

Accordingly, to achieve the object of the present invention, there is provided a method of coding an image signal through a discrete cosine transform. At least one is selected among a plurality of reference blocks. A scanning order in which to scan blocks to be coded of the reference blocks is generated and the blocks to be coded are scanned in the order of the generated scanning order.

The at least one selected reference block is temporally or spatially adjacent to the block to be coded. When the blocks to be coded are scanned, probabilities that non-zero coefficients occur are obtained from the at least one selected reference block and the scanning order is determined in descending order starting from the highest probability.

The scanning order is generated to be a zigzag scanning order if the probabilities are identical.

Also, in the method of coding an image signal through a discrete cosine transform, probabilities that non-zero coefficients occur are obtained from at least one of a plurality of reference blocks. A scanning order in which to scan blocks to be coded is determined in descending order starting from the highest probability and the blocks are scanned in the order of the scanning order.

The at lease one selected reference block is temporally or spatially adjacent to the block to be coded. The scanning order is determined to be a zigzag scanning order if the probabilities are identical. It is preferable that the scanning order is a single scanning order or a double scanning order.

To achieve the above object, there is provided a method of decoding an image signal through an inverse discrete cosine transform. At least one is selected among a plurality of reference blocks. A scanning order in which to scan blocks to be decoded is generated from the reference blocks and the blocks are scanned in the generated scanning order.

The at least one selected reference block is temporally or spatially adjacent to the block to be decoded. When the blocks are scanned, probabilities that non-zero coefficients occur are obtained from the at least one reference block. The scanning order is generated in descending order starting from the highest probability. The scanning order is generated to be a zigzag scanning order if the probabilities are identical.

Also, in the method of decoding an image signal through an inverse discrete cosine transform, probabilities that non-zero coefficients occur are obtained from at least one selected from a plurality of reference blocks, a scanning order in which to scan blocks to be decoded is determined in descending order starting from the highest probability, and the blocks are scanned in the scanning order.

The at least one reference block is temporally or spatially adjacent to the block to be decoded. The scanning order is determined to be a zigzag scanning order if the probabilities are identical. It is preferable that the scanning order is a single scanning order or a double scanning order.

BRIEF DESCRIPTION OF THE DRAWINGS

The above object and advantages of the present invention will become more apparent by describing in detail preferred embodiments thereof with reference to the attached drawings in which:

FIG. 5 is an example of an output signal which is quantized by the DCT system shown in FIG. 1;

FIG. 16 is a view of a block realized in step 610 of FIG. 6;

FIG. 17 is a view of a block realized in steps 620 and 630 of FIG. 6;

FIGS. 20 and 21 are views of schemes for transforming the scanning order of a single scanning mode into the scanning order of a double scanning mode according to the present invention;

FIGS. 22 through 24 are views of an embodiment for transforming the scanning order of a single scanning mode into the scanning order of a double scanning mode according to the present invention;

DETAILED DESCRIPTION OF THE INVENTION

Figure 1:
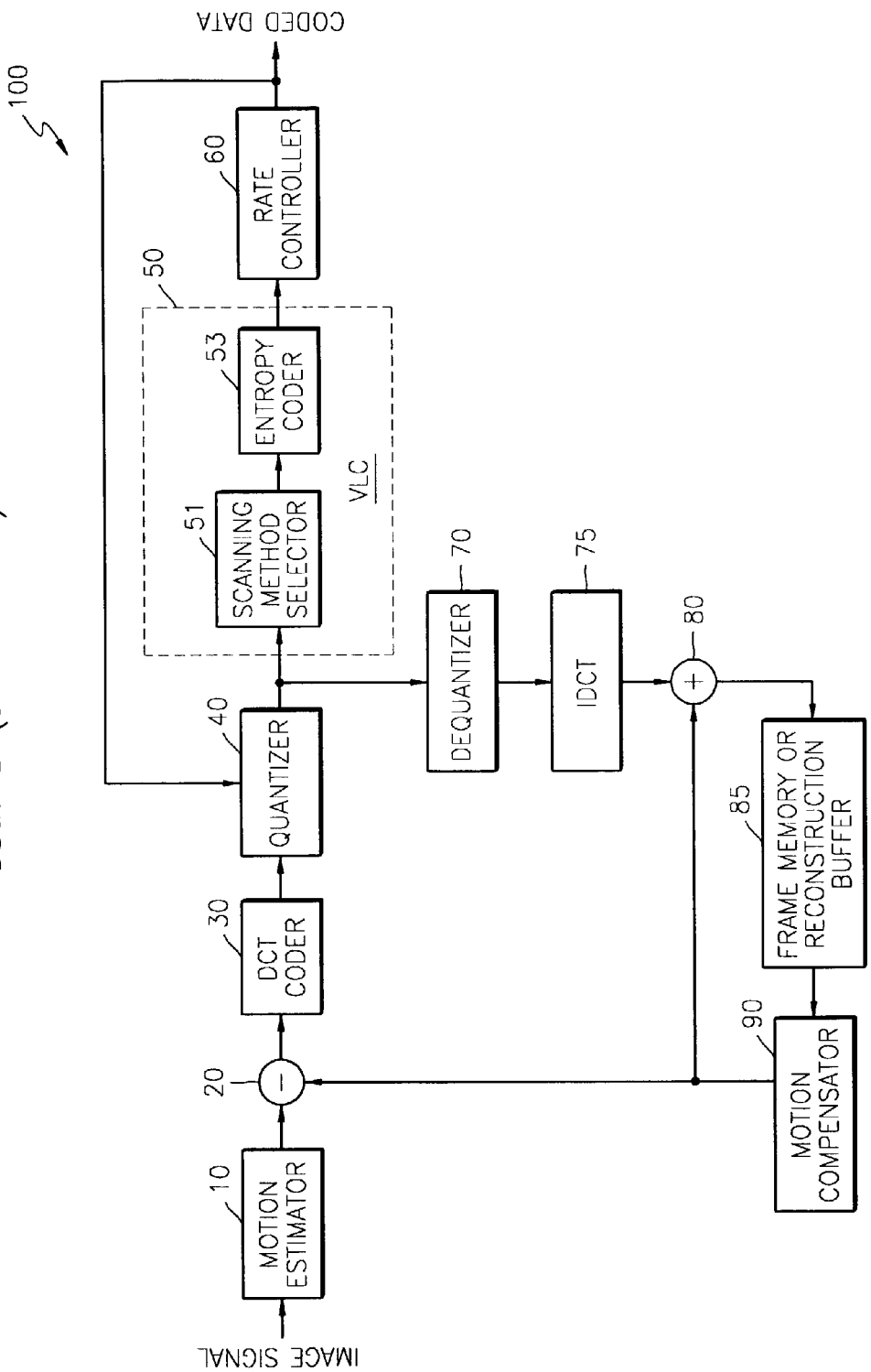
FIG. 1 is a block diagram of a general DCT coding system.

Attached drawings for illustrating a preferred embodiment of the present invention, and the contents written on the attached drawings must be referred to in order to gain a sufficient understanding of the merits of the present invention and the operation thereof and the objectives accomplished by the operation of the present invention.

Hereinafter, the present invention will be described in detail by explaining a preferred embodiment of the present invention with reference to the attached drawings. Like reference numerals in the drawings denote the same members.

FIG. 1 shows a block diagram of a general DCT coding system. Referring to FIG. 1, the DCT coding system (or an encoder 100) includes a motion estimator 10, a subtractor 20, a DCT coder 30, a quantizer 40, a variable length coder 50, a rate controller 60, a dequantizer 70, an inverse DCT (IDCT) 75, an adder 80, a frame memory or reconstruction buffer 85, and a motion compensator 90.

The variable length coder (hereinafter, referred to as "VLC") 50 includes a scanning pattern selector 51 and an entropy coder 53. A video coder used in MPEG-1, MPEG-2, MPEG-4, H.261, H.263, or JPEG is well-known in the art and thus will briefly be described.

The motion estimator 10 generates a motion vector in response to an image signal and outputs the motion vector to the subtractor 20. The subtractor 20 outputs the difference between signals output from the motion estimator 10 and the motion compensator 90 to the DCT coder 30.

The entire image is divided into sample blocks of m×n (here, m and n are natural numbers), each of which is sequentially input to the DCT coder 30. The DCT coder 30 transforms an image signal of a spatial domain into a transformed coefficient of a frequency domain. In other words, the DCT coder 30 transforms m×n sample blocks into m×n coefficient blocks. For example, the entire image may be divided into 4×4, 8×8, or 16×16 sample blocks. The quantizer 40 quantizes m×n coefficient blocks.

The dequantizer 70 dequantizes a signal output from the quantizer 40 and the IDCT 75 inverse-discrete-cosine-transforms a signal output from the dequantizer 70. The adder 80 adds signals output from the motion compensator 90 and the IDCT 75. The reconstruction buffer 85 stores a signal output from the adder 80. Thus, a signal corresponding to an original image signal is decoded in the reconstruction buffer 85.

The motion compensator 90 compensates for motion of a signal output from the reconstruction buffer 85. The variable length coder 50 assigns a short code to a high probability value (level) and a long code to a low probability value (level) in response to a signal output from the quantizer 40 in order to reduce the total number of bits of a data stream. The variable length coder 50 includes the scanning pattern selector 51 and the entropy coder 53.

The scanning pattern selector 51 selects a predetermined scanning pattern in response to a signal output from the quantizer 40 and thus transforms two-dimensional data into one-dimensional data.

The entropy coder 53 outputs coded data, e.g., a compressed bit stream, in response to a signal output from the scanning pattern selector 51. The entropy coder 53 may use hoffman coding or other coding.

The rate controller 60 controls a quantizer step size of the quantizer 40 in response to a signal output from the entropy coder 53.

The present invention relates to the operation of the scanning pattern selector 51, which selects an optimal scanning pattern with reference to at least one of a plurality of coded reference blocks to increase compression efficiency. The operation of the scanning pattern selector 51 will be described in detail with reference to FIG. 6.

An intra-frame in which an image signal itself is coded will be described with reference to FIG. 1. An image signal, e.g., a still image or moving image, is divided into blocks having a predetermined size, e.g., sample blocks of m×n, each of which is two-dimensionally quantized by the DCT coder 30 and the quantizer 40. The scanning pattern selector 51 transforms quantized data into one-dimensional data, and then the entropy coder 53 transforms the one-dimensional data into a compressed bit stream. A decoder decodes an original image signal from the bit stream by performing the inverse of the coding in the DCT coding system 100.

Next, an inter-frame will be described with reference to FIG. 1. An inter-frame uses a previous image signal to code a current image signal. The DCT coder 30 and the quanitzer 40 two-dimensionally quantize the difference between signals output from the motion estimator 10 and motion compensator 90. The scanning pattern selector 51 transforms quantized data into one-dimensional data and then the entropy coder 53 transforms the one-dimensional data into a compressed bit stream. The decoder decodes an original image signal from the bit stream by performing the inverse of the coding in the DCT coding system 100.

Figure 2:
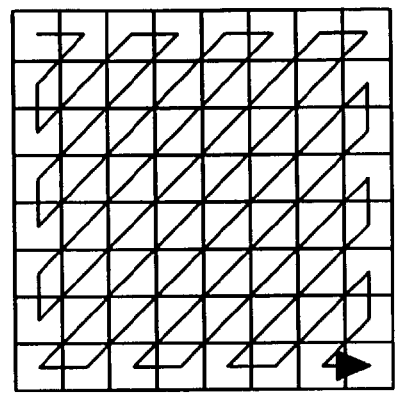
FIG. 2 is a view of a general zigzag scanning order.
Figure 3:
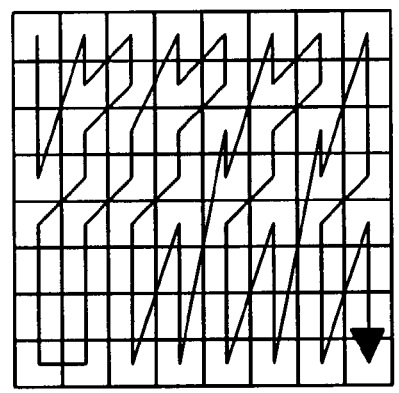
FIG. 3 is a view of a general vertical scanning order.
Figure 4:
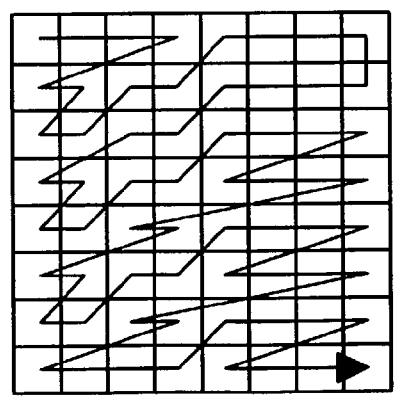
FIG. 4 is a view of a general horizontal scanning order.

FIG. 2 shows the order of general zigzag scanning, FIG. 3 shows the order of general vertical scanning, and FIG. 4 shows the order of general horizontal scanning. The scanning patterns of FIGS. 2 through 4 are examples of scanning patterns used in MPEG-4. Sample blocks of 8×8 are shown in FIGS. 2 through 4.

FIG. 5 shows an example of an output signal quantized by the DCT coding system 100 shown in FIG. 1. Referring to FIG. 5, a reference numeral 300 represents a quantized coefficient block of 8×8 and reference numeral 301 represents a quantized DC coefficient where a DC coefficient is 5. Reference numerals 302 through 304 represent quantized AC coefficients where AC coefficients are −1, 3, and 1, respectively.

In the case of MPEG-4, the scanning pattern selector 51 of FIG. 1 scans the block 300 using the scanning patterns shown in FIGS. 2 through 4 to extract information on a plurality of symbols "run, level, and last". Here, "run" represents the number of zeros between previous non-zero data and current non-zero data during the scanning according to the scanning patterns shown in FIGS. 2 through 4, "level" represents a level (value) of current non-zero data, and "last" represents whether data zero exists or not after current non-zero data.

For example, in a symbol 351 "0, 5, and 0", the first "0" represents that the number of "0"s before the DC coefficient 301 is zero in the zigzag scanning pattern, the second "5" represents that the current DC coefficient is 5, and the third "0" represents that there is data that is not "0" after the DC coefficient 301.

Also, in a symbol 354 "5, 1, and 1", the first "5" represents that the number of "0"s before the AC coefficient 304 is 5 in the zigzag scanning pattern, the second "1" represents that the current AC coefficient is 1, and the third "1" represents that there is no non-zero data after the AC coefficient 304. The vertical scanning pattern can easily be understood with reference to FIGS. 3 and 5 and the horizontal scanning pattern can easily be understood with reference to FIGS. 4 and 5.

Each of VLCs 356 through 359, 367 through 370, or 378 through 381 represents each bit pattern corresponding to the table of an entropy coder of MPEG-4 with respect to each of symbols 351 through 354, 362 through 365, or 373 through 376. In other words, a bit pattern of the symbol 351 "0, 5, and 0" is "011000" 356 and a bit pattern of the symbol 363 "0, −1, and 0" is "101".

The quantities of bits 360, 371, and 382 represent the sum of all the bits corresponding to the symbols 351 through 354, 362 through 365, and 373 through 376, respectively. For example, 4 symbols of the zigzag scanning pattern consist of 24 bits, 4 symbols of the vertical scanning pattern consist of 19 bits, and 4 symbols of the horizontal scanning pattern consist of 30 bits. Each symbol has a different "run" and thus the quantities of bits depend on each of the scanning patterns.

Figure 6:
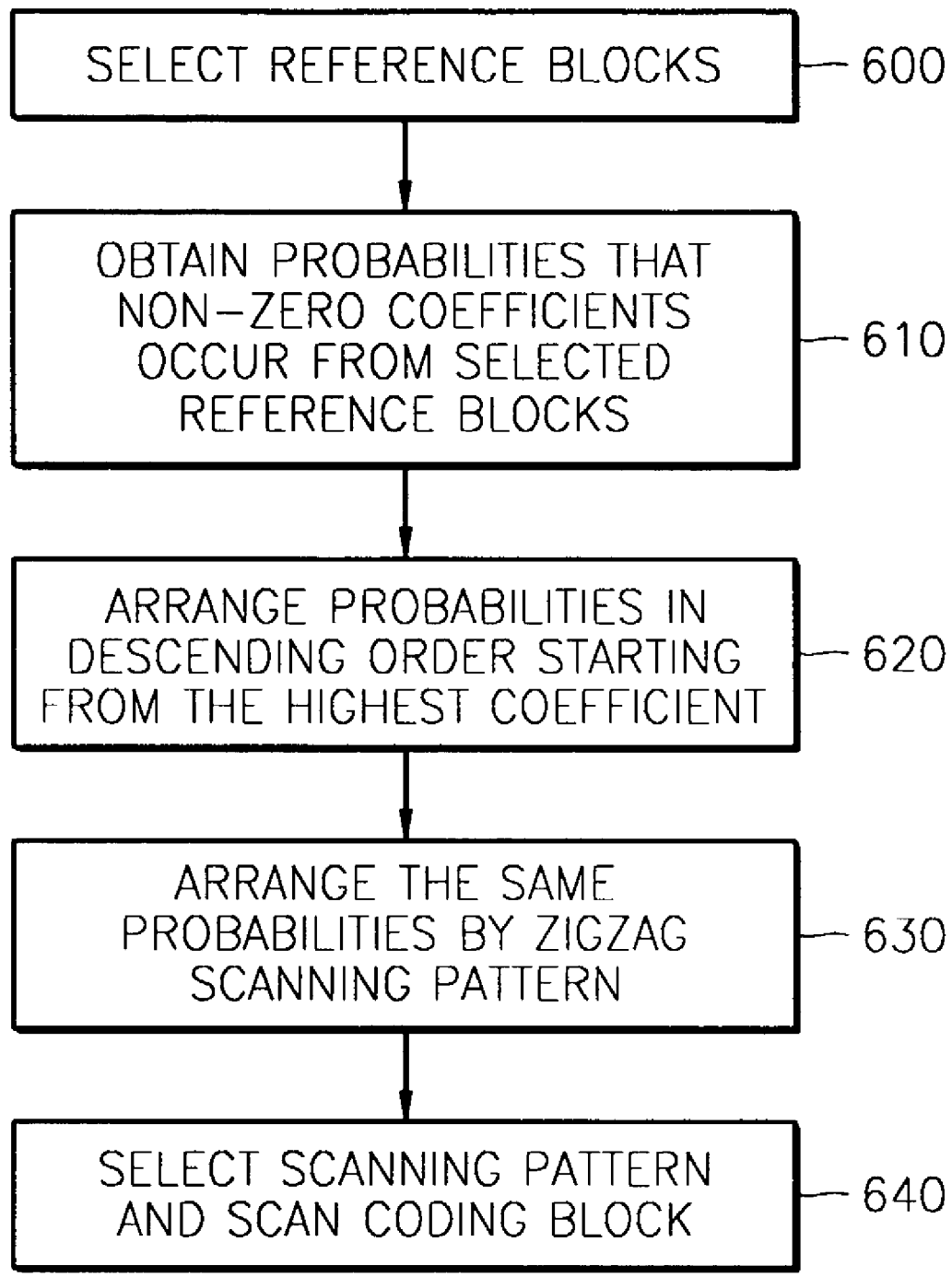
FIG. 6 is a flowchart of an optimal scanning method according to the present invention.

FIG. 6 is a flowchart of an optimal scanning method according to the present invention. Referring to FIG. 6, at least one block spatially or temporally adjacent to a block to be coded (hereinafter, referred to as "coding block") are selected as reference blocks in step 600. The selected reference blocks are previously-coded and quantized blocks.

The probabilities that non-zero coefficients occur in each coefficient position are obtained from each reference block in step 610. The probabilities that non-zero coefficients occur are arranged in descending order starting from the highest coefficient in step 620. The same probabilities are arranged by the zigzag scanning pattern in step 630. A scanning pattern which is determined through steps 620 and 630 is selected and the coding block is scanned by the selected scanning pattern in step 640.

Figure 7:
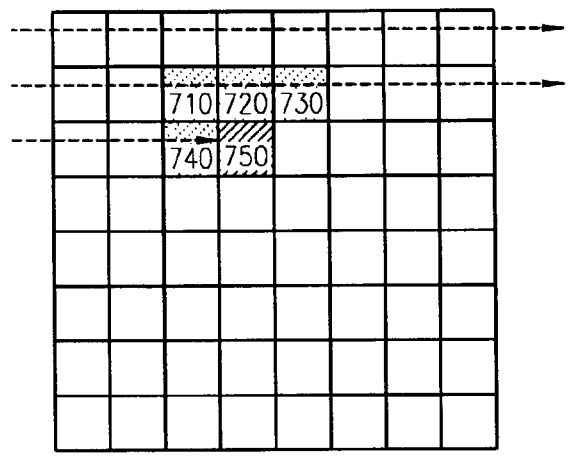
FIG. 7 is a view of a first example of reference blocks.

FIG. 7 shows a first example of reference blocks. Referring to FIG. 7, blocks 710 through 740, which are adjacent to a block 750, are selected as reference blocks to select a scanning pattern for the block 750. The reference blocks 710 through 740 may be used in video coding of the intra-frame. The reference blocks 710 through 740 are previously-coded blocks.

Figure 8:
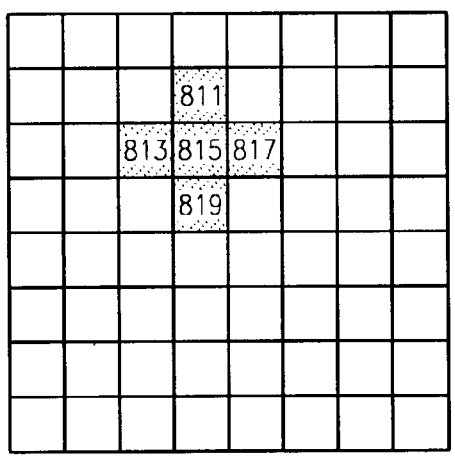
FIG. 8 is a view of a second example of reference blocks.
Figure 8:
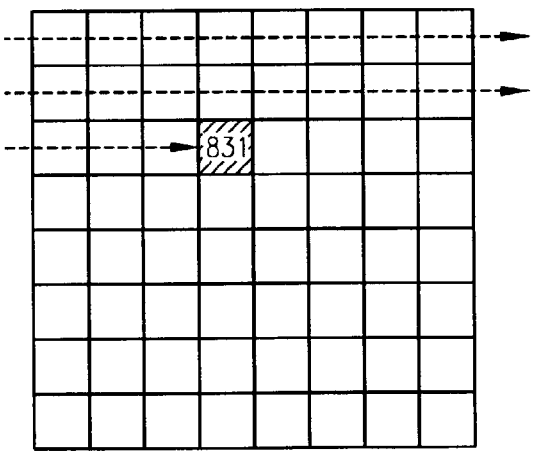
Figure 8:
Figure 8:

FIG. 8 shows a second example of reference blocks. Referring to FIG. 8, blocks 811, 813, 815, 817, and 819 in a reference frame t-1 adjacent to a current frame t are selected as reference blocks to select a scanning pattern for a block (coding block) 831 of the current frame t. The reference blocks 811, 813, 815, 817, and 819 may be used in video coding of an inter-frame. The reference frame t-1 represents the previous frame of the current frame t.

Figure 9:
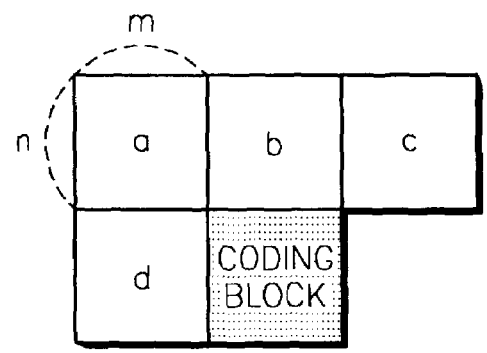
FIGS. 9 through 11 are views of a third example of reference blocks.
Figure 10:
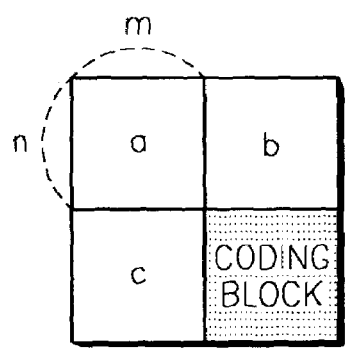
Figure 11:
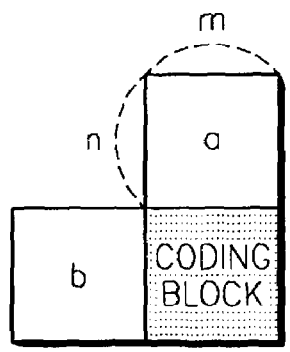

FIGS. 9 through 11 show a third example of reference blocks. A coding block scanning pattern of FIG. 9 is determined with reference to all of adjacent blocks a, b, c, and d; a coding block scanning pattern of FIG. 10 is determined with reference to all of adjacent blocks a, b, and c; and a coding block scanning pattern of FIG. 11 is determined with reference to all of adjacent blocks a and b. Each of blocks a, b, c, and d is a block of m×n which is a sample block.

Figure 12:
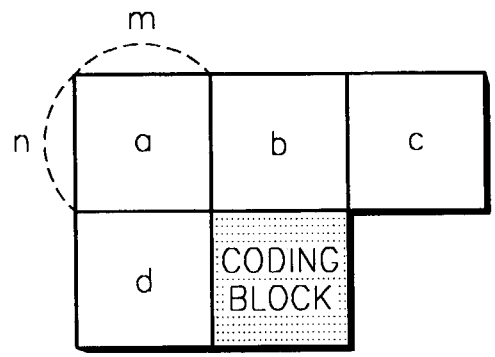
FIGS. 12 through 14 are views of a fourth example of reference blocks.
Figure 13:
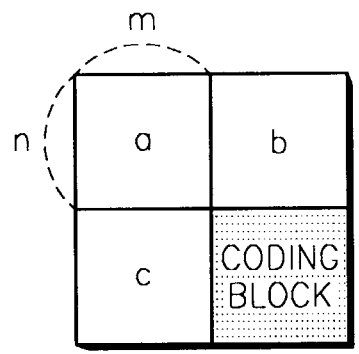
Figure 14:
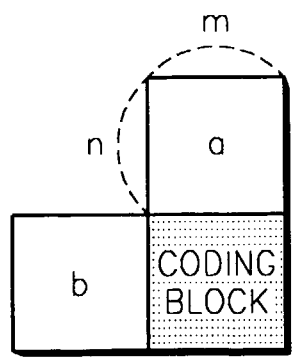

FIGS. 12 through 14 show a fourth example of reference blocks. A coding block scanning pattern of FIG. 12 is determined with reference to the most suitable one of adjacent blocks a, b, c, and d. A coding block scanning pattern of FIG. 13 is determined with reference to the most suitable one of adjacent blocks a, b, and c. A coding block scanning pattern of FIG. 14 is determined with reference to the most suitable one of adjacent blocks a and b. Each of blocks a, b, c, and d is a block of m×n. Examples shown in FIGS. 7 through 14 are only to select reference blocks.

Figure 15:
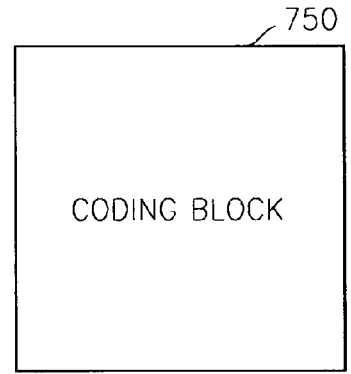
FIG. 15 is a view of blocks realized in step 600 of FIG. 6.

FIG. 15 shows blocks realized in step 600 of FIG. 6. Referring to FIG. 15, reference blocks 710 through 740 are previously-coded blocks, which are spatially adjacent to a coding block 750. Each of blocks 710 through 740 is a block of 8×8.

FIG. 16 shows a block realized in step 610 of FIG. 6. Referring to FIGS. 15 and 16, a block 800 of 8×8 consists of 64 sub-blocks. The number in each sub-block represents the probability of a non-zero coefficient compared to reference blocks. For example, if DC coefficients of the reference blocks 710 through 740 are 5, 3, 3, and 4, respectively, the probability of a non-zero coefficient compared to the reference blocks 710 through 740 is 4/4. Also, if AC coefficients of the reference blocks 710 through 740 are 4, 2, 0, and 4, respectively, the probability of a non-zero coefficient compared to the reference blocks 710 through 740 is 3/4.

FIG. 17 shows a block realized in steps 620 and 630 of FIG. 6. Each number in FIG. 17 represents a position in a scanning sequence, which is determined by the order of probabilities that non-zero coefficients occur. If the probabilities are identical, the scanning order is determined depending on the order of the zigzag scanning pattern. The scanning sequence of FIG. 17 is not predefined and is determined corresponding to at least one of blocks temporally or spatially adjacent to a block to be coded. Thus, a coding block scanning pattern according to the present invention is most suitable and efficient for a current coding block. As a result, compression efficiency of an image signal increases.

Figure 18:
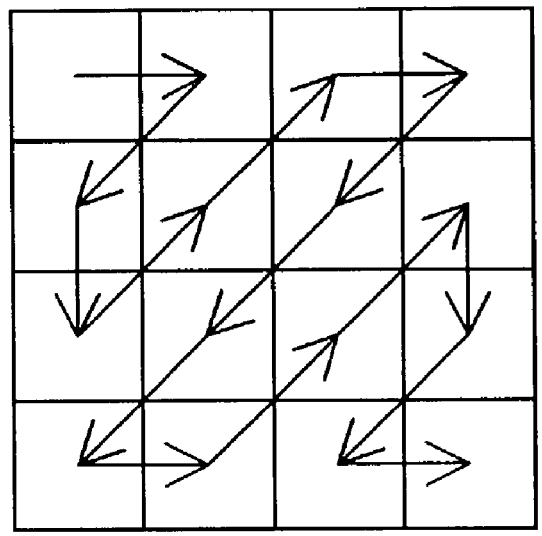
FIGS. 18 and 19 are views of scanning patterns used in a H.26L video coder.
Figure 19:
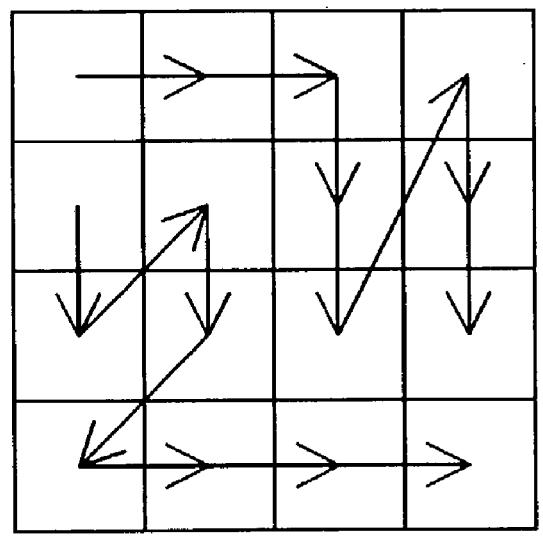

FIGS. 18 and 19 show scanning patterns used in a H.26L video coder. FIG. 18 shows a single scanning mode, which is the same as the conventional zigzag scanning pattern and FIG. 19 shows a double scanning mode. The double scanning mode scans two times without repetition. H.26L is a standard made by the International Telecommunications Union Telecommunications standardization sector (ITU-T).

FIGS. 20 and 21 show schemes which transform the scanning order of a single scanning mode into the scanning order of a double scanning mode. FIG. 20 shows the scanning order (a→b→c→d→, ... →n→o→p) of the signal scanning mode according to the present invention and FIG. 21 shows the scanning order of the double scanning mode according to the present invention. Referring to FIGS. 20 and 21, the scanning order of the double scanning mode is obtained by dividing the scanning order of the single scanning mode into in even-numbered scanning sequence (a→c→e→g→i→k→m→o) and an odd-numbered scanning sequence (b→d→f→h→j→l→n→p).

FIGS. 22 through 24 show an embodiment in which the scanning order of a single scanning mode is transformed into the scanning order of a double scanning mode. FIG. 22 shows the probabilities that non-zero coefficients occur in one or more reference blocks, FIG. 23 shows the scanning order of the single scanning mode which is determined by the probabilities of FIG. 23, and FIG. 24 shows that the scanning order of the single scanning mode shown in FIG. 23 is transformed into the scanning order of the double scanning mode according to the scheme shown in FIG. 21.

The even-numbered scanning order (0→2→4→6→8→10→12→14) of FIG. 23 is transformed into the scanning order (0→1→2→3→4→5→6→7) in FIG. 24, and the odd-numbered scanning order (1→3→5→7→9→11→13→15) of FIG. 23 is transformed into the scanning order(0→1→2→3→4→5→6→7) in FIG. 24.

Figure 25:
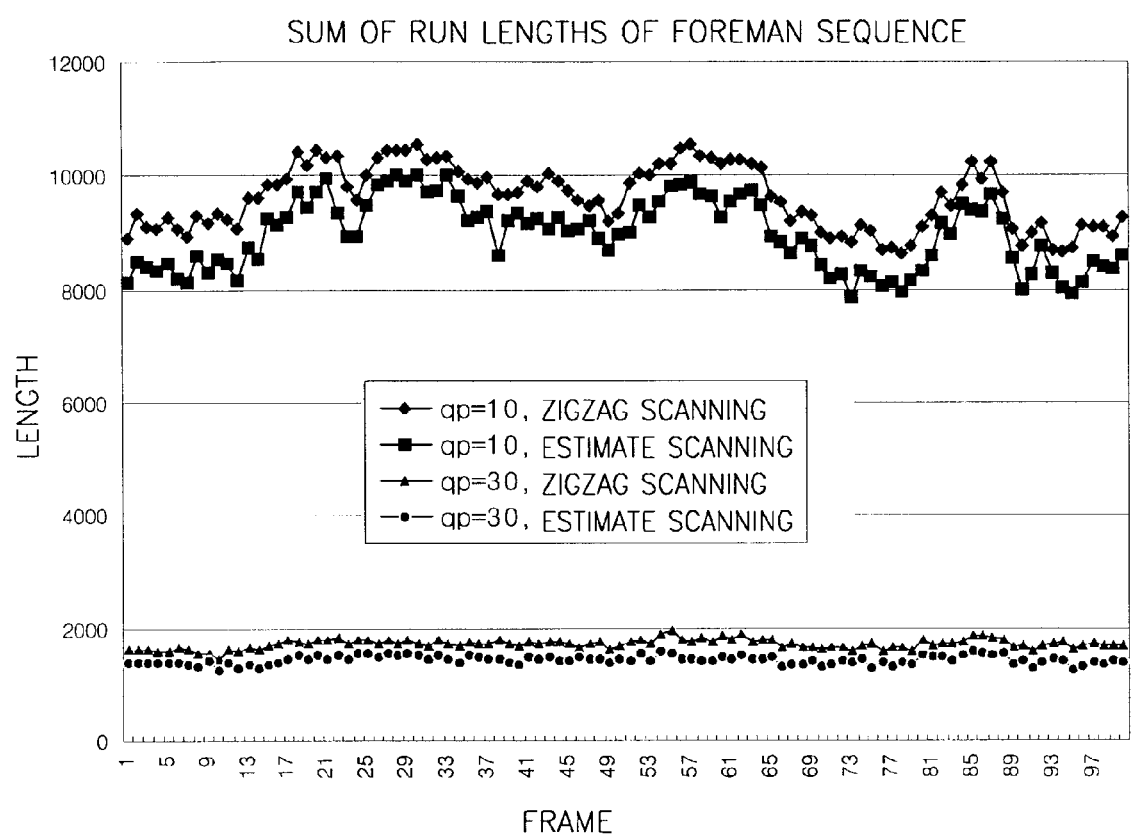
FIG. 25 is a graph showing the sum of run lengths generated by a scanning pattern according to the present invention and a Foreman sequence.
Figure 26:
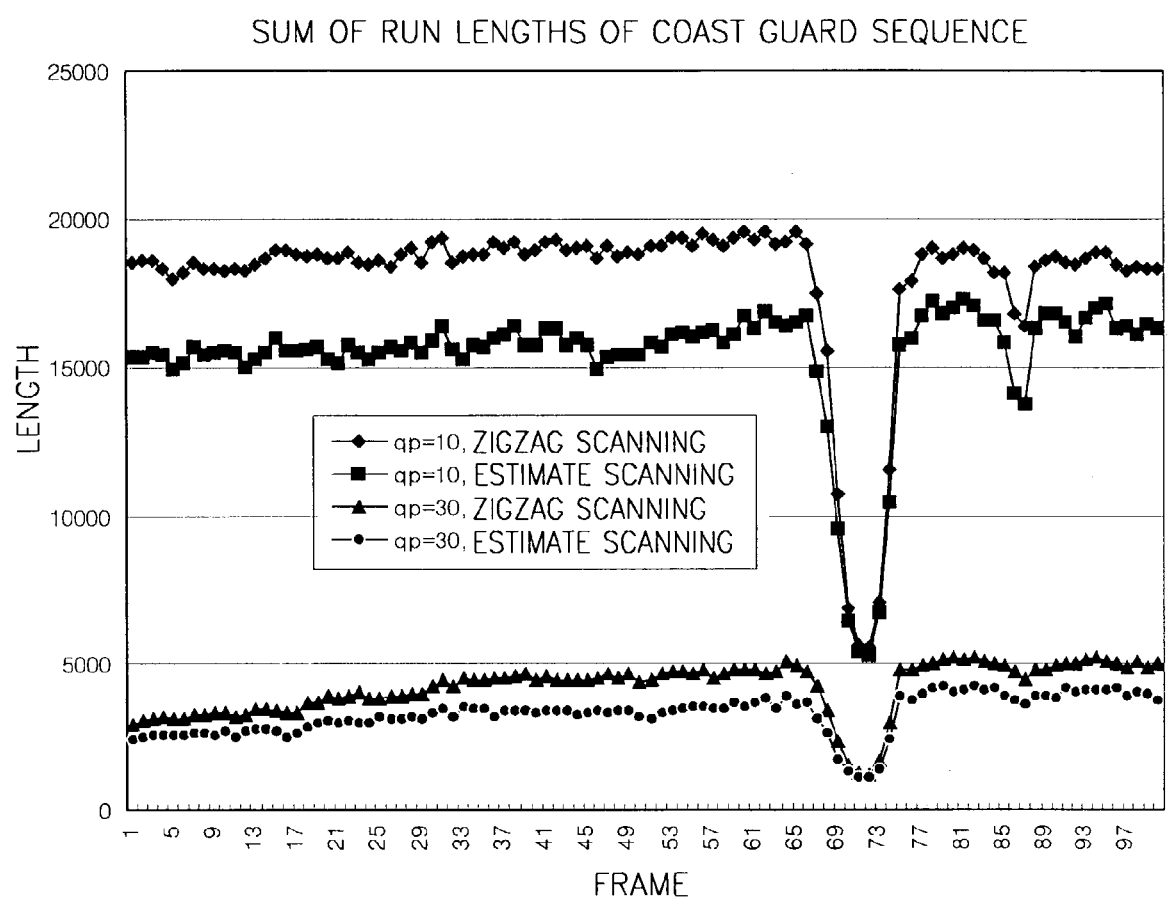
FIG. 26 is a graph showing the sum of run lengths generated by a scanning pattern according to the present invention and a Coast Guard sequence.
Figure 27:
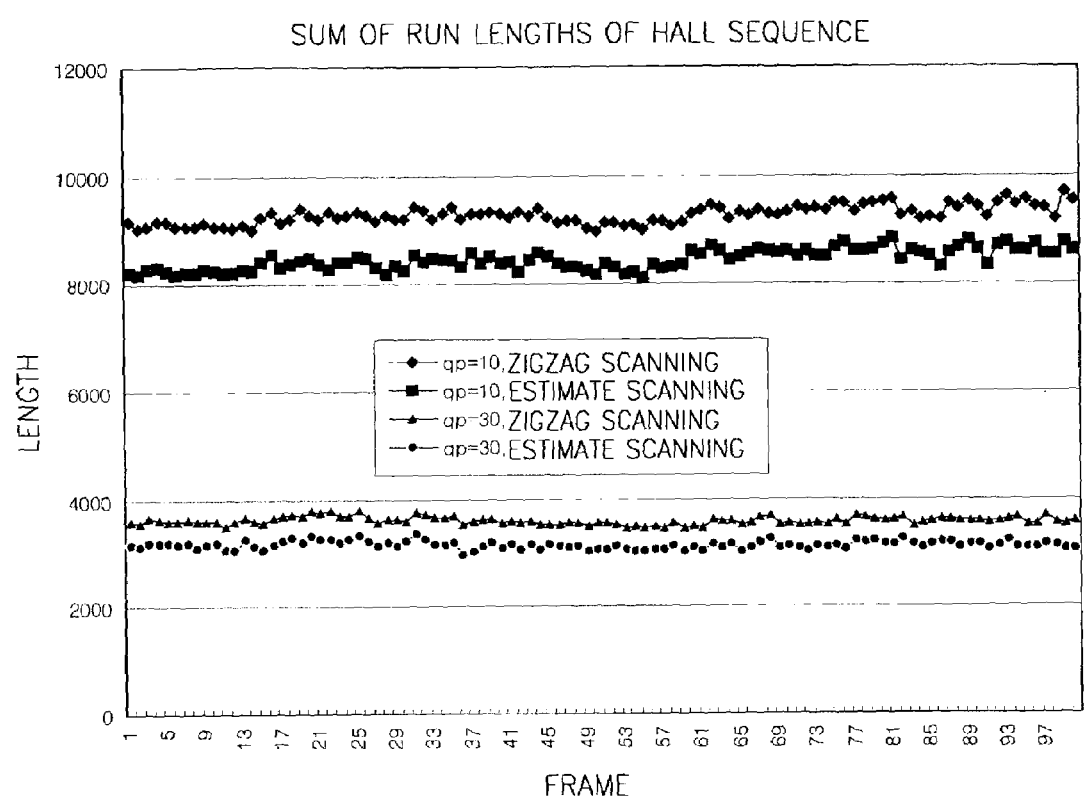
FIG. 27 is a graph showing the sum of run lengths generated by a scanning pattern according to the present invention and a Hall sequence.

FIG. 25 is a graph showing the sum of run lengths occurring due to a scanning pattern according to the present invention and a Forman sequence. FIG. 26 is a graph showing the sum of run lengths occurring due to a scanning pattern according to the present invention and a Coast Guard sequence. FIG. 27 is a graph showing the sum of run lengths occurring due to a scanning pattern according to the present invention and a Hall sequence. FIGS. 25 through 27 show the total length of run lengths obtained by applying the scanning pattern of the present invention and the conventional zigzag scanning pattern to 100 intra-frames.

Referring to FIGS. 25 through 27, qp represents quantizer step size. Picture quality becomes poor and data is reduced as qp increases. However, data is increased and picture quality is improved as qp decreases.

Referring to FIGS. 25 through 27, it is seen that the run length of the scanning pattern according to the present invention is reduced compared to the run length of the conventional zigzag scanning pattern. Thus, the scanning pattern of the present invention increases the video compression efficiency.

Also, a decoder can generate the same scanning pattern as a scanning pattern generated by a coder. Thus, the decoder does not need any additional information on the scanning pattern used in the coder.

Moreover, a scanning pattern for coding according to the present invention can use all possible patterns. A scanning pattern for decoding according to the present invention can also use all possible scanning patterns. Thus, signal compression efficiency is increased more than when a conventional scanning pattern for coding is used.

As described above, a scanning method for coding/decoding according to the present invention can use an optimal scanning method. Thus, signal compression efficiency increases. Also, the scanning method for coding/decoding according to the present invention can use all combined scanning patterns. Further, a scanning pattern for coding according to the present invention reduces run length to reduce the quantity of generated bits.

While this invention has been particularly shown and described with reference to an embodiment thereof, it will be understood by those skilled in the art that various changes in form and details may be made therein without departing from the spirit and scope of the invention as defined by the appended claims.

What is claimed is:

1. A method of coding an image signal through a discrete cosine transform, the method comprising:
   (a) selecting at least one among a plurality of reference blocks, the reference blocks being previously coded, wherein at least one reference block temporally or spatially adjacent to a block to be coded is selected; and
   (b) generating a scanning order in which to scan blocks to be coded based on the at least one selected reference block and scanning the blocks to be coded in the order of the generated scanning order, wherein generating a scanning order includes:
      (b1) obtaining probabilities that non-zero coefficients occur from the at least one selected reference block; and
      (b2) determining the scanning order in descending order starting from the highest probability, wherein if two or more probabilities are identical, then a zigzag scanning order is generated for the non-zero coefficients having identical probabilities.

2. The method of claim 1, wherein the scanning order is a double scanning order.

3. A method of coding an image signal through a discrete cosine transform, the method comprising:
   obtaining probabilities that non-zero coefficients occur from at least one selected from a plurality of reference blocks, the reference blocks being previously coded, wherein the at least one selected reference block is temporally or spatially adjacent to a block to be coded; and
   determining a scanning order in which to scan blocks to be coded in descending order starting from the highest probability and scanning the blocks in the order of the scanning order, wherein if two or more probabilities are identical, then a zigzag scanning order is generated for the non-zero coefficients having identical probabilities.

4. The method of claim 3, wherein the scanning order is a double scanning order.

5. The method of claim 3, wherein the scanning order is divided into an even-numbered scanning order and an odd-numbered scanning order and the scanning is performed without overlapping the even-numbered scanning order and the odd-numbered scanning order.

6. A method of decoding an image signal through an inverse discrete cosine transform, the method comprising:
   (a) selecting at least one among a plurality of reference blocks, wherein the at least one selected reference block is temporally or spatially adjacent to a block to be decoded; and
   (b) generating a scanning order in which to scan blocks to be decoded from the reference blocks and scanning the blocks in the generated scanning order, wherein generating a scanning order includes:
      (b1) obtaining probabilities that non-zero coefficients occur from the at least one reference block; and
      (b2) generating the scanning order in descending order starting from the highest probability, wherein if two or more probabilities are identical, then a zigzag scanning order is generated for the non-zero coefficients having identical probabilities.

7. The method of claim 6, wherein the scanning order is a double scanning order.

8. A method of decoding an image signal through an inverse discrete cosine transform, the method comprising:
   obtaining probabilities that non-zero coefficients occur from at least one selected from a plurality of reference blocks, wherein the at least one selected reference block is temporally or spatially adjacent to a block to be decoded; and determining a scanning order in which to scan blocks to be decoded in descending order starting from the highest probability and scanning the blocks in the scanning order, wherein if two or more probabilities are identical, then a zigzag scanning order is generated for the non-zero coefficients having identical probabilities.

9. The method of claim 8, wherein the scanning order is a double scanning order.

10. The method of claim 8, wherein the scanning order is divided into an even-numbered scanning order and an odd-numbered scanning order and the scanning is performed without overlapping the even-numbered scanning order and the odd-numbered scanning order.

* * * * *